Figure 1:
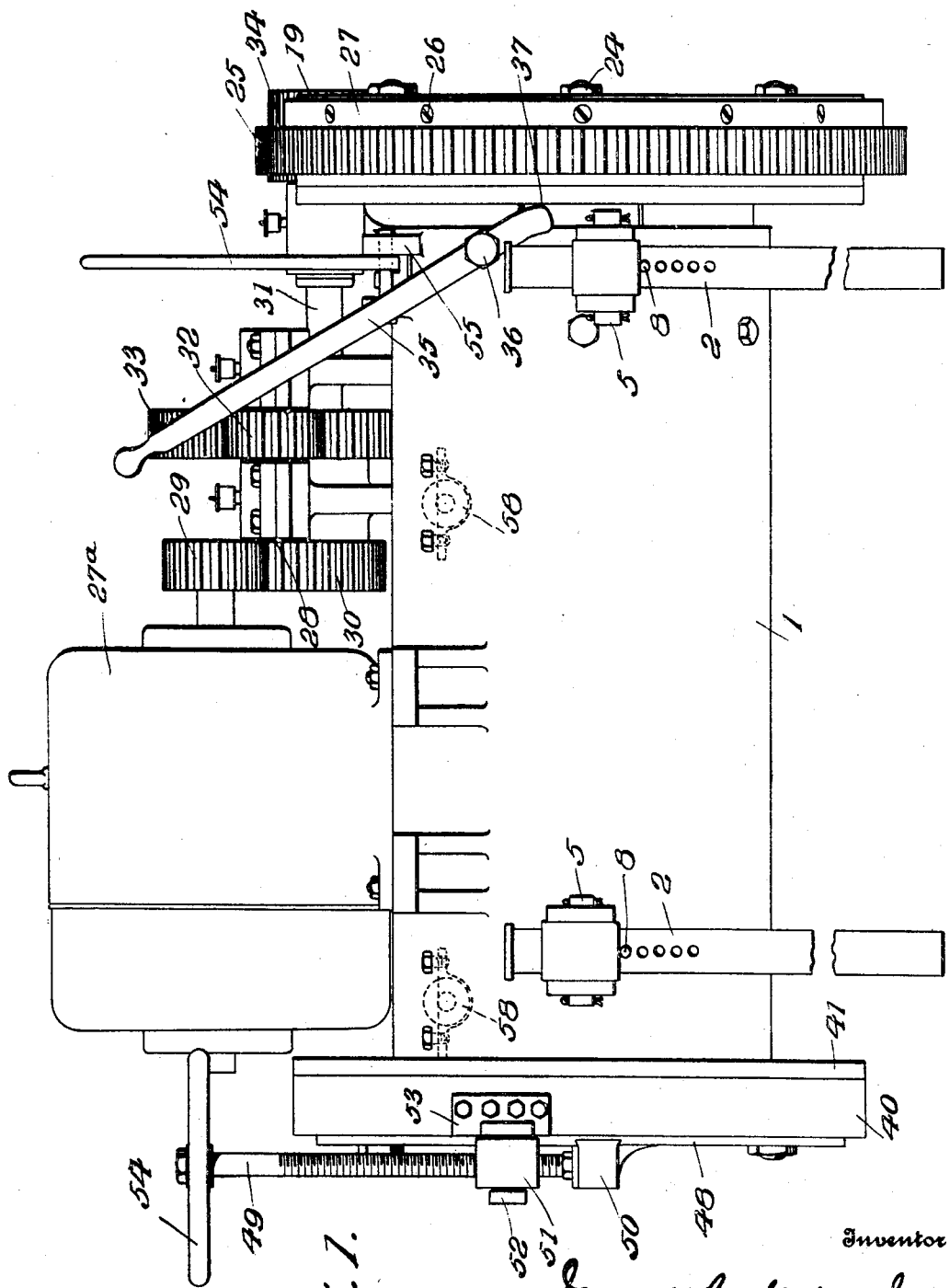

J. ANDERSON, Jr.
PIPE LAYING MACHINE.
APPLICATION FILED AUG. 7, 1915.

1,185,962.

Patented June 6, 1916.
6 SHEETS—SHEET 1.

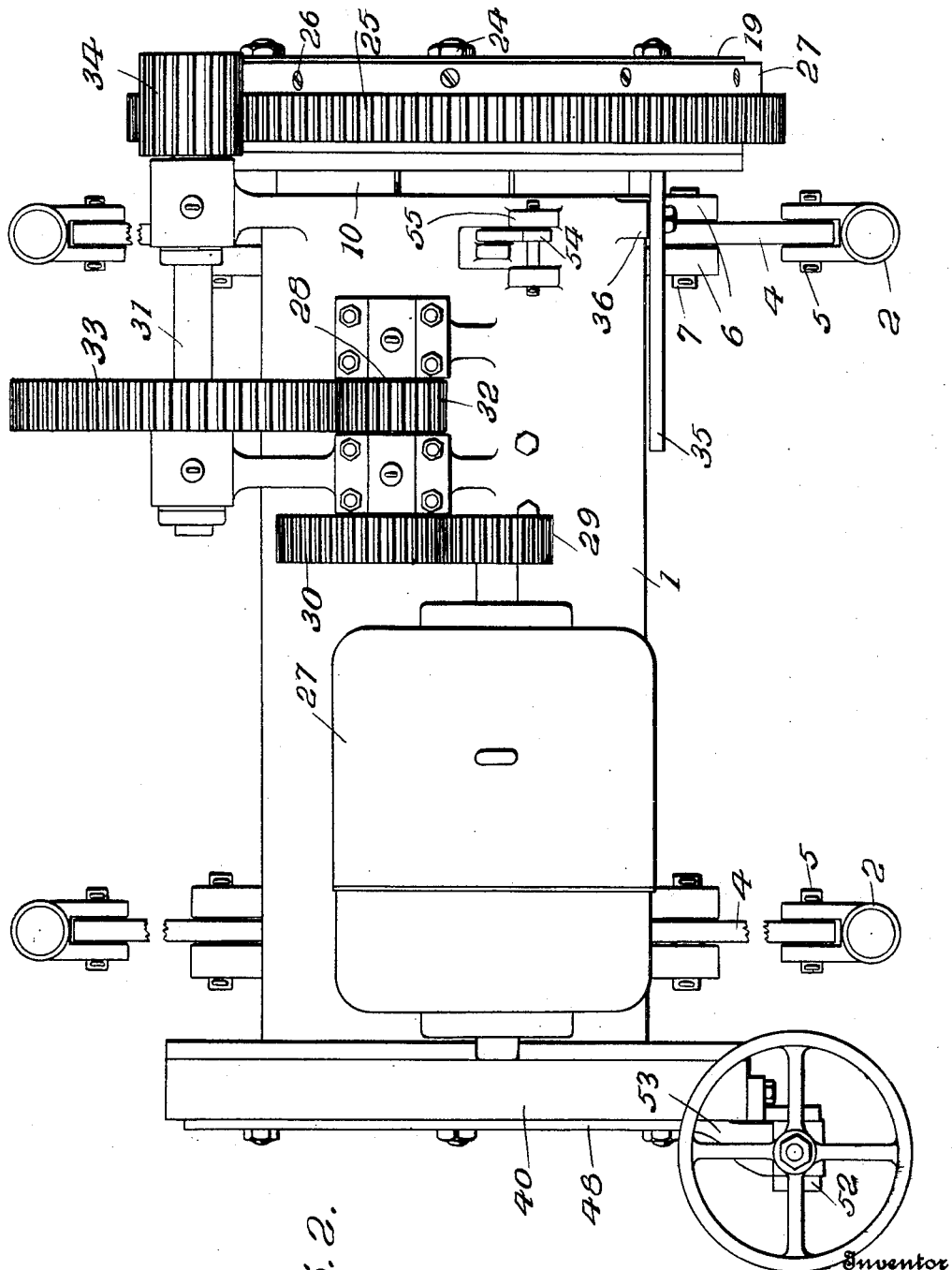

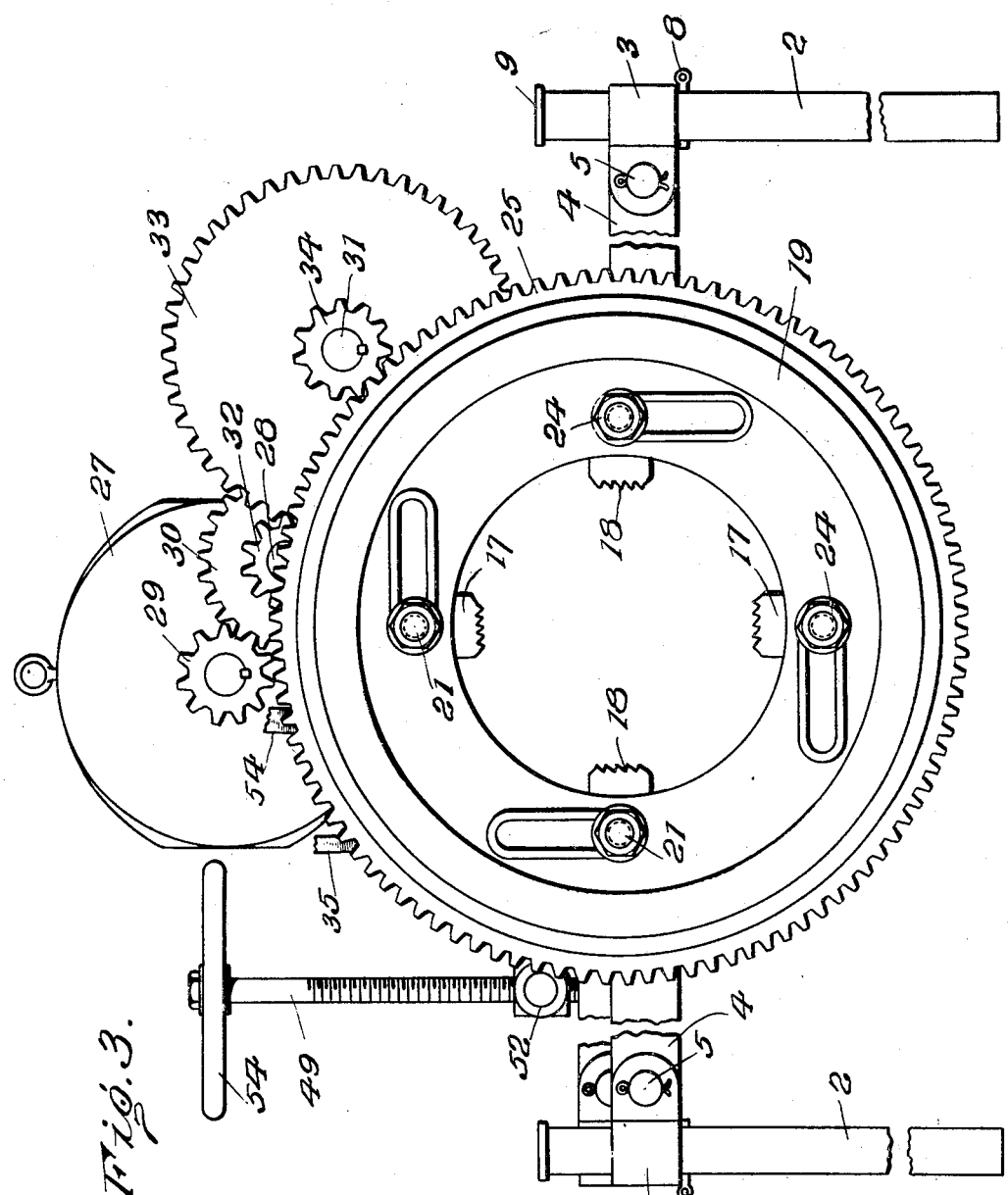

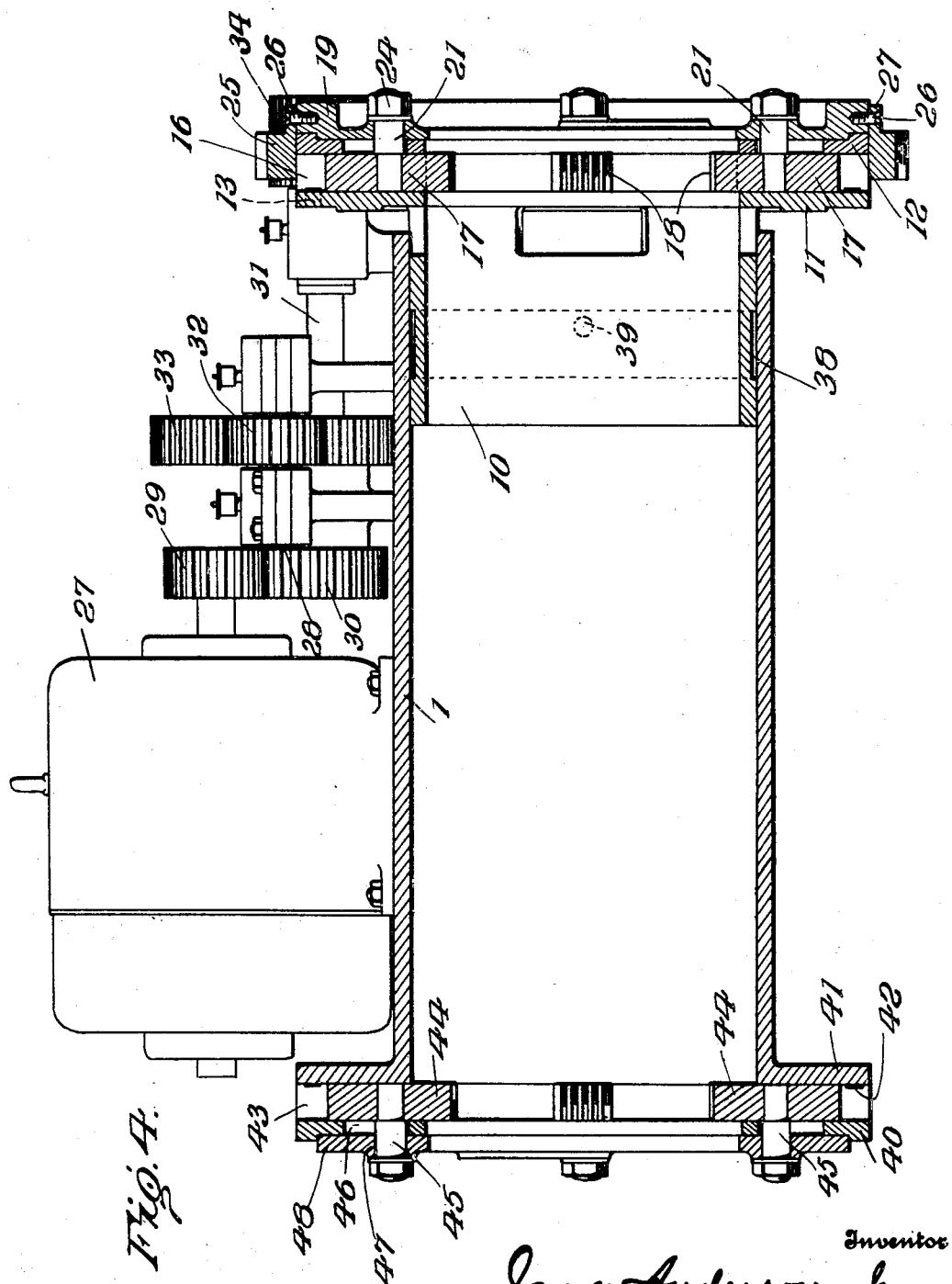

J. ANDERSON, Jr.
PIPE LAYING MACHINE.
APPLICATION FILED AUG. 7, 1915.
1,185,962.
Patented June 6, 1916.
6 SHEETS—SHEET 5.
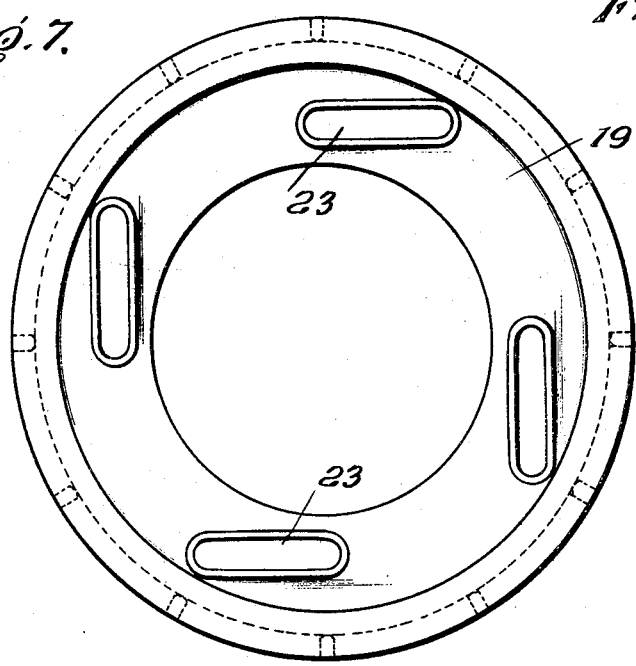
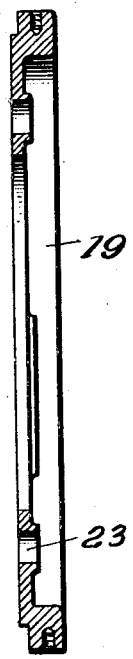
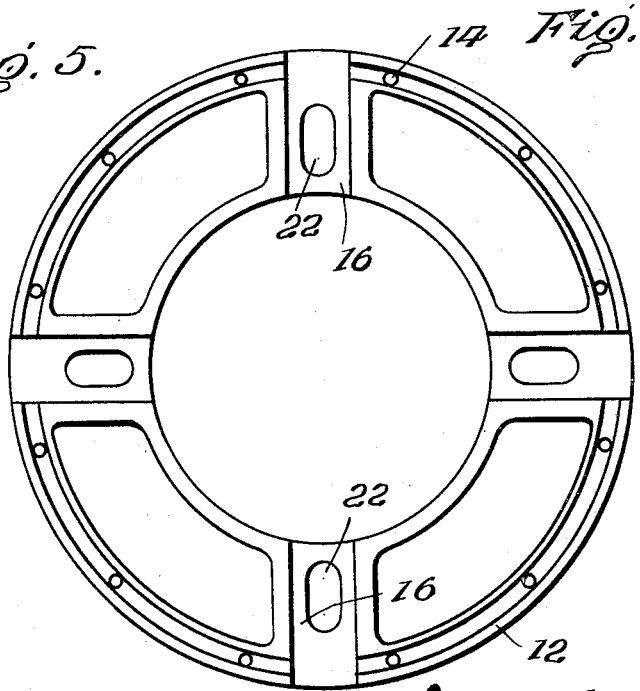
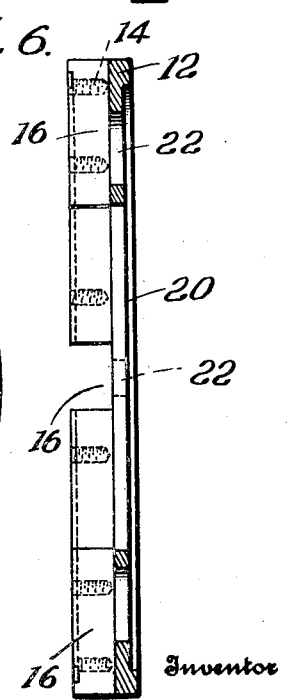

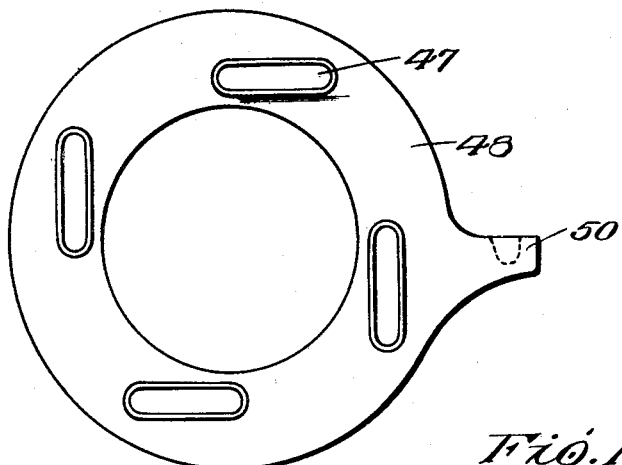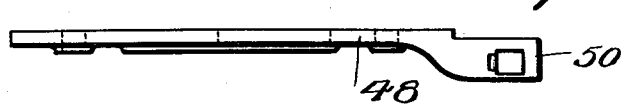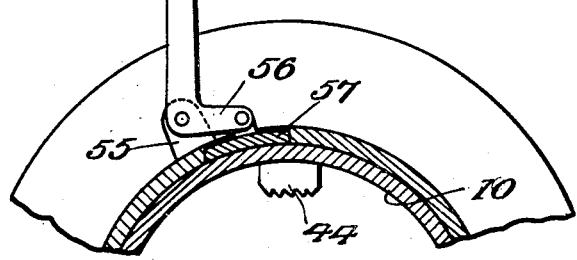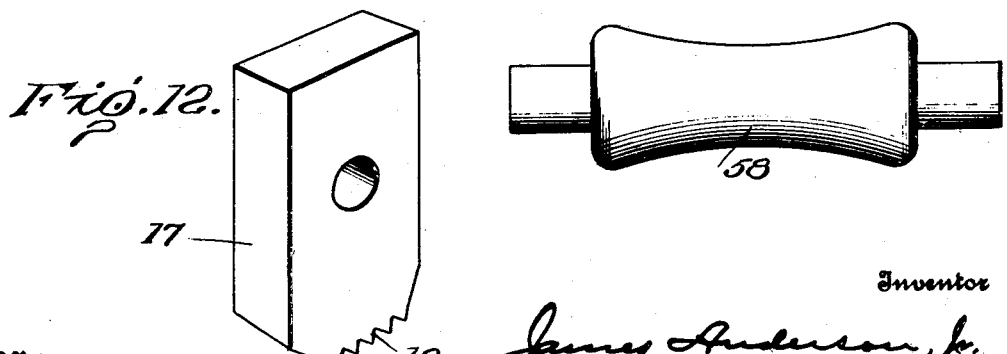

UNITED STATES PATENT OFFICE.

JAMES ANDERSON, JR., OF SHREVEPORT, LOUISIANA.

PIPE-LAYING MACHINE.

1,185,962.  Specification of Letters Patent.  Patented June 6, 1916.

Application filed August 7, 1915. Serial No. 44,274.

*To all whom it may concern:*

Be it known that I, JAMES ANDERSON, Jr., a citizen of the United States, residing at Shreveport, Caddo parish, and State of Louisiana, have invented and discovered certain new and useful Improvements in Pipe-Laying Machines, of which the following is a specification.

The present invention relates to pipe laying machinery and consists in the combinations and arrangements of parts hereinafter described and particularly set forth in the accompanying claims.

The invention has for its purpose to provide a self contained and portable machine for laying and connecting pipes having screw-threaded joints, which is adapted to be mounted and to travel on the pipe line progressively as the sections thereof are united.

The invention further contemplates constructing the machine to carry its own motor, and which is adapted to be anchored to the pipe line as it is laid when operating to connect the several pipe sections, and one wherein the operating mechanism is readily controllable from one position.

The invention is shown by way of illustration in the accompanying drawings, wherein:

Figure 1 is a side elevational view of the machine complete, Fig. 2 a top plan view thereof, Fig. 3 a front elevational view from the pipe turning head end, Fig. 4 a longitudinal sectional view with the motor and turning head driving connections in elevation, Fig. 5 a front elevational view of the jaw carrying plate of the turning head, Fig. 6 a transverse sectional view thereof, Fig. 7 a front elevational view of the jaw actuating plate of the turning head, Fig. 8 a transverse sectional view thereof, Fig. 9 a front elevational view of the jaw actuating plate of the machine anchoring device, Fig. 10 an edge elevational view thereof, Fig. 11 a detailed view of the cylinder brake, Fig. 12 a detailed view of one of the pipe engaging jaws, and Fig. 13 one of the machine supporting rollers.

Referring to the construction in detail, the machine comprises a body or cylinder 1, having at one end thereof a rotatable head adapted to engage and operate the pipe section to be connected, and having a means at its other end for anchoring the machine to the pipe section laid. And four "spud sticks," or legs, are provided for temporarily supporting the machine from the ground and for manually manipulating the same. Each of said legs consists of a pipe length 2, slidable through a sleeve 3 that is secured to a flat bar 4 by a pin 5, and said bar 4 is secured to the cylinder body between the pair of lugs 6 by the pin 7. The pipe length 2 is adjustably mounted in the sleeve by means of the pin 8 fitting in apertures formed in said pipe, and a head 9 is formed on the top thereof to prevent the pipe from coming out of the sleeve. When it is desired to move the machine along the pipe line, the spud stick, or leg, may be raised to a horizontal position and this affords a lever for hauling or lifting the machine.

The turning head consists of a sleeve 10 mounted to rotate within one end of the cylinder and formed with a flange 11 to which is secured the plate 12 by means of a plurality of screws 13 that enter apertures 14 and 15 formed in said plate and flange, respectively. A number of radially disposed slots 16 are formed in the plate 12 to receive the jaws 17, having teeth 18 adapted to bitingly engage with the pipe section to be coupled. A plate 19 fits within the face 20 of the plate 12 (see Fig. 4) and is held therein by the pins 21 carried by the jaws 17 and projecting through the slots 22 of the jaw carrying plate and the cam slots 23 of the plate 19, and said pins 21 are threaded to receive the clamping nuts 24. A spur gear, comprising a toothed ring 25, is mounted on the plate 19 and secured thereto by screws 26 passing through a flange 27 formed on said ring.

The turning head is adapted to be operated and the jaws thereof simultaneously brought to engage with the pipe by the motor 27ª mounted on the cylinder 1 and geared to drive the counter shaft 28 through the meshing pinions 29 and 30. The driven shaft 31 is operated from the shaft 28 by the meshing pinions 32 and 33, and a relatively broad pinion 34, mounted on the shaft 31, engages with the teeth of the gear wheel 25 to rotate the turning head. The initial rotation of the plate 19 causes the jaws 17 to be moved inwardly through the action of the cam slots 23, and when said jaws impinge the pipe, the further rotation of the turning head will operate to revolve the pipe bodily and screw the same into the adjoining section. Since the turning head is secured to the pipe to be connected and must therefore move axially therewith, the pinion 34 is made sufficiently broad to engage with the gear wheel 25 as the turning head moves inwardly, and the turning head is moved to normal position by means of the lever 35 that is fulcrumed on the frame at 36 to engage with the face of the sleeve flange 11, as at 37, in the manner clearly shown in Figs. 1 and 2. The sleeve 10 is annularly reduced, as at 38, to receive the stops 39 on the cylinder for limiting the endwise movement of the turning head, as will be understood.

The device for anchoring the machine consists of a plate 40 designed similarly to the plate 12, and secured to the flange 41 of the cylinder by means of screws 42. A number of radial slots 43 in the plate 40 receive the jaws 44 that impinge with the pipe section previously coupled, and said jaws are operated after the manner of jaws 17, *i. e.*, the jaws 44 carry pins 45 passing through apertures 46 in the plate 40 and through cam slots 47 of the turning plate 48. The plate 48 (see Figs. 9 and 10) is operated by means of a screw rod 49 (see Figs. 1 and 2) engaging with a lug 50 formed on the plate 48 and having a recess that receives the screw end. The screw rod 49 is threaded through the sleeve 51 and said sleeve is pivotally mounted in the fork 52 of the bracket 53 secured on the cylinder. The screw shaft is manipulated by the ordinary hand-turning wheel 54. The teeth of the respective jaws 17 and 44 are oppositely pitched to the end that said jaws will effectively bite into the pipe sections, *i. e.*, one to anchor the machine and the other to rotate the pipe to be coupled.

A lever 54 is fulcrumed between lugs 55 on the cylinder and has an arm 56 carrying a shoe 57, of brass or other suitable material, adapted to frictionally engage with the sleeve 10 of the turning head and temporarily hold said head against rotation in order that the initial movement of the cam slotted plate 19 will cause the jaws 17 to be brought into engaging position.

In operation, the machine is held off the ground by means of the spud sticks, and the pipe to be connected is started into the collar in the ordinary way by the "pipestabber" and turned in a few threads by rope, then the machine is rolled forward until the front clutch or turning head is just past the threads on the joint to be screwed in. The jaws now being in position, the further rotation of the turning head screws the pipe into the collar of the pipe previously laid. The anchoring device, or brake clutch, is then released and the motor reversed, which releases the jaws of the turning head, when the machine may be lowered onto the pipe line by rollers 58 (see Fig. 1) and the machine then moved ahead bodily to the next joint.

It is obvious that those skilled in the art may vary the details of construction and arrangement of parts without departing from the spirit of the invention, and therefore I do not wish to be limited to such features except as may be required by the claims.

Having thus fully described my said invention, what I claim as new and desire to secure by Letters Patent, is:

1. In a pipe laying machine the combination, of a cylinder, means for anchoring the cylinder, a head rotatably mounted on the cylinder, jaws carried by said head, a cam plate connected to actuate the jaws to engage the pipe to be laid, and means for rotating the cam plate to actuate said jaws and rotate the head, substantially as set forth.

2. In a pipe laying machine the combination, of a cylinder, means for anchoring the cylinder, a head rotatably mounted on the cylinder, a slotted plate mounted on the head, jaws mounted in the slots of said plate adapted to engage the pipe to be laid, a cam plate connected to actuate said jaws, and means for rotating the cam plate to actuate said jaws and rotate the head, substantially as set forth.

3. In a pipe laying machine the combination, of a cylinder, means for anchoring the cylinder, a head rotatably mounted on the cylinder, a slotted plate mounted on the head, jaws mounted in the slots of said plate adapted to engage the pipe to be laid, pins carried by said jaws, a plate having cam slots receiving said pins, and means for rotating the cam plate to actuate said jaws and rotate the head, substantially as set forth.

4. In a pipe laying machine the combination, of a cylinder adapted to be anchored, a head rotatably and slidably mounted on the cylinder, jaws carried by said head adapted to engage the pipe to be laid, means for slidably moving the head, and means for rotating the head, substantially as set forth.

5. In a pipe laying machine the combination, of a cylinder adapted to be anchored, a head rotatably and slidably mounted on the cylinder, jaws carried by said head adapted to engage the pipe to be laid, a lever fulcrumed on the cylinder for slidably moving the head, and means for rotating the head, substantially as set forth.

6. In a pipe laying machine the combination, of a cylinder adapted to be anchored, a head rotatably and slidably mounted on the cylinder, a slotted plate mounted on the head, jaws mounted in the slots of said plate adapted to engage the pipe to be laid, a cam plate connected to actuate said jaws, means for slidably moving the head, and means for moving the jaws to engaging position and rotating the head, substantially as set forth.

7. In a pipe laying machine the combination, of a cylinder adapted to be anchored, a head rotatably and slidably mounted on the cylinder, a slotted plate mounted on the head, jaws mounted in the slots of said plate adapted to engage the pipe to be laid, pins carried by said jaws, a plate having cam slots receiving said pins, a pinion mounted on the cam slotted plate, a motor mounted on the cylinder connected to operate said pinion to move said jaws into engaging position and to rotate the head, and a lever fulcrumed on the cylinder operable to slidably move the head, substantially as set forth.

8. In a pipe laying machine the combination, of a cylinder, a head rotatably mounted on the cylinder and having means adapted to engage and operate the pipe to be laid, a slotted plate mounted on the cylinder, jaws mounted in the slots of said plate adapted to engage with the pipe laid, a rotatable plate operable to move said jaws into engaging position, and a screw shaft mounted on the cylinder for operating the rotatable plate, substantially as set forth.

9. In a pipe laying machine the combination, of a cylinder, a head rotatably mounted on the cylinder and having means adapted to engage and operate the pipe to be laid, a slotted plate mounted on the cylinder, jaws mounted in the slots of said plate adapted to engage the pipe laid, pins carried by said jaws, a plate having cam slots receiving said pins and operable to move the jaws into engaging position, and a screw-threaded rod mounted on the cylinder and connected to said cam slotted plate to operate the same to move the jaws, substantially as set forth.

10. In a pipe laying machine the combination, of a cylinder, means mounted on the cylinder for engaging respectively the pipe laid and the pipe to be laid, and a plurality of adjustable supporting legs pivotally mounted on the cylinder, said legs adapted to be disposed horizontally to provide hand gripping levers for manipulating the machine, substantially as set forth.

11. In a pipe laying machine the combination, of a cylinder, means mounted on the cylinder for engaging respectively the pipe laid and the pipe to be laid, a plurality of laterally projecting bars pivotally mounted on the cylinder, and a plurality of supporting legs for the machine adjustably mounted on said bars, substantially as set forth.

12. In a pipe laying machine the combination, of a cylinder, means mounted on the cylinder for engaging respectively the pipe laid and the pipe to be laid, a plurality of laterally projecting bars pivotally mounted on the cylinder, sleeves mounted on the ends of said bars, and supporting legs for the machine adjustably mounted on said sleeves, substantially as set forth.

In witness whereof, I have hereunto set my hand and seal at Shreveport, Louisiana, this 4th day of August, A. D. nineteen hundred and fifteen.

JAMES ANDERSON, Jr. [L. S.]

Witnesses:
 FLORA TUCKER,
 A. G. NUSSER.